(12) United States Patent
Sexton et al.

(10) Patent No.: US 6,877,161 B1
(45) Date of Patent: Apr. 5, 2005

(54) ADDRESS CALCULATION OF INVARIANT REFERENCES WITHIN A RUN-TIME ENVIRONMENT

(75) Inventors: Harlan Sexton, Menlo Park, CA (US); David Unietis, Menlo Park, CA (US); Peter Benson, Boulder, UT (US)

(73) Assignee: Oracle International Corp., Redwood Shores, CA (US)

( * ) Notice: Subject to any disclaimer, the term of this patent is extended or adjusted under 35 U.S.C. 154(b) by 0 days.

(21) Appl. No.: 09/248,294

(22) Filed: Feb. 11, 1999

(51) Int. Cl.[7] .................................................. G06F 9/00
(52) U.S. Cl. ...................................... 719/310; 711/220
(58) Field of Search ................................ 719/310, 315; 711/100, 200, 220; 707/103 R

(56) References Cited

U.S. PATENT DOCUMENTS

| | | | |
|---|---|---|---|
| 5,426,747 A | | 6/1995 | Weinreb et al. |
| 5,794,256 A | | 8/1998 | Bennett et al. |
| 5,805,896 A | | 9/1998 | Burgess |
| 5,845,331 A | * | 12/1998 | Carter ........................ 711/163 |
| 6,003,123 A | * | 12/1999 | Carter et al. ................ 711/207 |
| 6,009,266 A | * | 12/1999 | Brownell .................... 709/315 |
| 6,105,041 A | | 8/2000 | Bennett et al. |
| 6,128,621 A | | 10/2000 | Weisz |
| 6,154,823 A | | 11/2000 | Benayon et al. |
| 6,178,519 B1 | | 1/2001 | Tucker |
| 6,199,141 B1 | | 3/2001 | Weinreb et al. |
| 6,298,401 B1 | | 10/2001 | Anderson |
| 6,345,276 B1 | * | 2/2002 | Lee ............................. 707/100 |
| 6,434,685 B1 | * | 8/2002 | Sexton et al. ............... 711/206 |
| 6,499,095 B1 | * | 12/2002 | Sexton et al. ............... 711/203 |

FOREIGN PATENT DOCUMENTS

| | | | |
|---|---|---|---|
| EP | 0 700 000 A2 | 3/1996 | |
| EP | 0 874 309 A2 | 10/1998 | |
| EP | 0967546 A2 | 12/1999 | |
| GB | 2 239 335 A | 9/1990 | |

OTHER PUBLICATIONS

Kelly E. Murray, "Under the Hood: CLOS," Journal of Object–Oriented Programming, pp. 82–86, Sep. 1996.*
Bruce Millard et al., "Run–Time Support and Storage Management for Memory–Mapped Persistent Objects" Dec. 1993, IEEE.
PCT Notification of Transmittal of The International Search Report or the Declaration dated Sep. 12, 2000.
Pointer Swizzling at Page Fault Time: Efficiently Supporting Huge Address Spaces on Standard Hardware—Jun. 1991 No. 4—pp. 6–13.
Working with Persistant Objects: to Swizzle or Not to Swizzle—pp. 657–673.
XP–002141155—Generational Garbage Collection pp. 143–163.
XP–002141152—Introduction pp. 1–38.
XP–002141153—A Real–Time Garbage Collector Based on the Lifetimes of Objects—vol. 26 No. 6.
XP–002141154—Oracle8i Java Developer's Guide—pp. 1–17.

* cited by examiner

*Primary Examiner*—Meng-Al T. An
*Assistant Examiner*—Li Zhen
(74) *Attorney, Agent, or Firm*—Ditthavong & Carlson, P.C.

(57) ABSTRACT

Efficient address calculation of invariant reference within a run-time environment is attained by a self-relative numeric reference format for run-time storage of references. A self-relative numeric reference format specifies the location of a reference object relative to a pointer to the referencing object as an integer value. The machine pointers and numeric references may be tagged, and a tag assignment is disclosed so that a self-relative numeric reference is generated from machine pointers by calculating a pointer difference, and a machine pointer to the referenced object is generated by adding the self-relative numeric reference to a machine pointer to the referencing object.

26 Claims, 2 Drawing Sheets

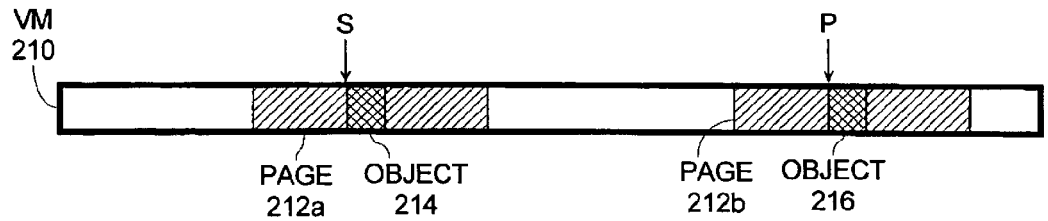
FIG. 2
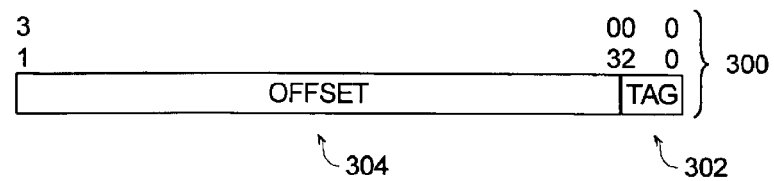
FIG. 3
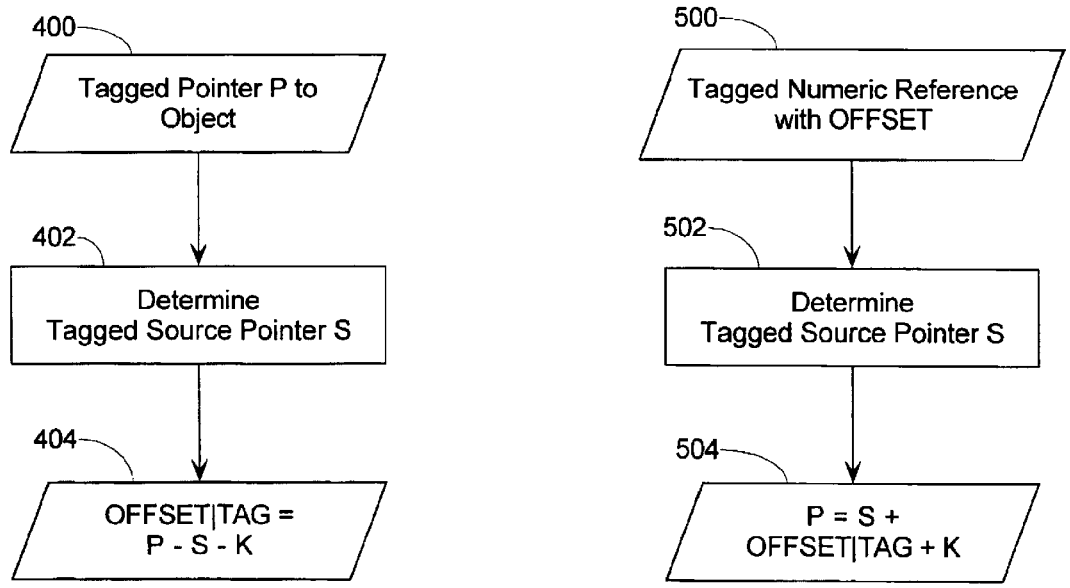
FIG. 4     FIG. 5

ADDRESS CALCULATION OF INVARIANT REFERENCES WITHIN A RUN-TIME ENVIRONMENT

RELATED APPLICATIONS

The present application is related to the following applications:

U.S. Pat. No. 6,457,019, entitled "A Memory Management System Within a Run-Time Environment," filed on even date herewith by Harlan Sexton et al., the contents of which are hereby incorporated by reference.

U.S. Pat. No. 6,449,095 entitled "A Machine Independent Memory Management System Within a Run-Time Environment," filed on even date herewith by Harlan Sexton et al. the contents of which are hereby incorporated by reference.

U.S. Pat. No. 6,434,685, entitled "A Paged Memory Management System Within a Run-Time Environment," filed on even date herewith by Harlan Sexton et al., the contents of which are hereby incorporated by reference.

FIELD OF THE INVENTION

The present invention relates to computer systems and more particularly to managing memory for a run-time execution environment.

BACKGROUND OF THE INVENTION

A dynamic run-time environment for a language such as JAVA™ is responsible for managing memory for objects that are created and destroyed during the execution of a program. An object is an entity that encapsulates data and, in some languages, operations associated with the object. Since the encapsulated data is stored in memory, objects are associated with particular regions of memory that are allocated and deallocated by the dynamic run-time environment.

The state of a program, or "program state," is the set of the objects and the references between the objects that exist at a specific point in time during the execution of the program. A "reference" is used by a run-time environment to identify and ultimately access the region of memory for storing the data of the object. Typically, references between objects in a run-time environment are encoded using machine pointers. A machine pointer is a native object that contains the address of the object in the main memory, which can be a real memory address or, more commonly, a virtual address on a machine that implements a virtual memory system. Since machine pointers are closely coupled to the underlying hardware and firmware of a computer system, machine pointers have high performance and, hence, are a popular implementation for references.

In a run-time environment, however, program state with machine-specific references such as machine pointers is sometimes disadvantageous. For example, it may be desirable to store the program state on disk or another secondary storage medium and restore the stored program state to main memory. Some run-time environments, in fact, are designed to use the same program state on different types of machines. For instance, such run-time environments provide load-balancing and crash recovery functions by transferring the execution of a program from one machine to another.

One approach for addressing machine independence, known as "pointer swizzling," employs two completely different formats for representing references: a machine-dependent runtime format using pointers for references in main memory, and a platform invariant format for encoding references in secondary storage. When the reference is written to secondary storage, machine pointers are converted into a machine-independent symbol such as a string or a serial number. When the reference is read back into main memory from secondary storage, the symbol is unswizzled and converted back into a machine pointer. Swizzling is also referred to as "serialization" and "pickling."

The swizzling and the unswizzling operations, however, are computationally expensive, requiring many memory accesses into an auxiliary symbol table, typically implemented by a hash table or binary tree stored in memory. Thus, frequent storage and retrieval of program state into and out of secondary storage can be responsible for a significant drain on system performance. Furthermore, the computational expense of swizzling makes symbols even more impractical as a run-time reference format because conversion between machine pointers occurs much more frequently.

SUMMARY OF THE INVENTION

Accordingly, there is a need for an invariant reference storage format that is machine independent or capable of being transferred quickly between different processes. A need exists for an efficient technique of converting references between an invariant reference format and a native machine pointer format, so that an invariant reference format is suitable for use as a run-time storage format.

These and other needs are addressed by the present invention by providing a self-relative numeric reference format for run-time storage of references. A numeric reference format specifies the location of objects relative to an implied pointer and an integer value. Since the value of a numeric reference bears some relationship to the address of the referenced object, numeric references can be easily and efficiently converted into a machines pointers and back. Furthermore, the representation of a numeric reference is invariant because it is an integer value. A self-relative numeric reference encodes the location of an object relative to a pointer to a referencing object that contains the self-relative numeric reference. The self-relative numeric reference format is efficient because the pointer to the referencing object is readily available.

One aspect of the invention relates to a computer-implemented method and a computer-readable medium bearing instructions for managing memory. The methodology includes storing objects in a memory and storing references between the objects in the memory as self-relative numeric references. According to one feature, the references are calculated as pointer differences between a first machine pointer to a first object and a second machine pointer to a second object to produce a self-relative numeric reference.

In accordance with one embodiment, the first and second machine pointers and the self-relative numeric references are tagged to encode information about the objects, and calculating the references may also include subtracting a predetermined constant. In one implementation, the self-relative numeric reference is tagged to indicate whether the first and second machine pointers have the same or different contiguities, for example, by encoding this information within an N-bit tag by tag values that differ by a remainder congruent to $2^{N-1}$ modulo $2^N$.

Another aspect of the invention involves a computer-implemented method and a computer-readable medium bearing instructions for generating a first tagged machine pointer to a first object referenced by a second object. The methodology includes fetching a tagged numeric reference stored within the second object based on a second tagged machine pointer that points to the second object and generating the first tagged machine pointer, and adding the tagged numeric value to the second tagged machine pointer. According to one implementation, the self-relative numeric reference is tagged to indicate whether the first and second have the same or different contiguities, for example, by encoding this information within an N-bit tag by tag values that differ by a remainder congruent to $2^{N-1}$ modulo $2^N$.

Still other needs addressed by and advantages attained by the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a schematic drawing of a portion of a memory configuration.

FIG. 3 is schematic drawing of a layout of a self-relative numeric reference.

FIG. 4 is a flowchart for generating a self-relative numeric reference from a machine pointer.

FIG. 5 is a flowchart for dereferencing a self-relative numeric reference.

DESCRIPTION OF THE PREFERRED EMBODIMENT

Figure 1:
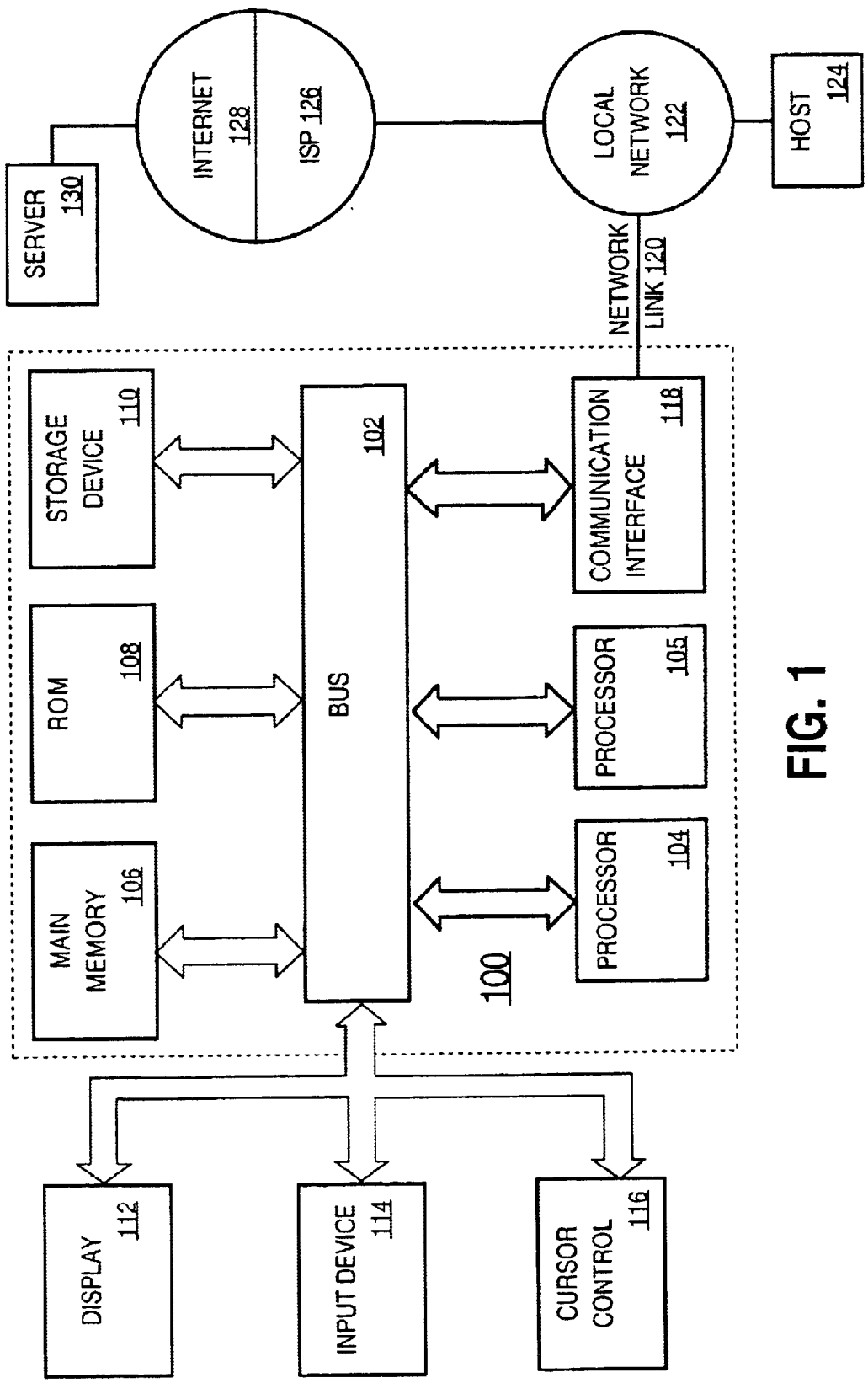
FIG. 1 depicts a computer system that can be used to implement the present invention.

A method and apparatus for managing memory within a run-time environment is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

FIG. 1 is a block diagram that illustrates a computer system 100 upon which an embodiment of the invention may be implemented. Computer system 100 includes a bus 102 or other communication mechanism for communicating information, and processors 104 and 105 both coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104 and processor 105. Computer system 100 further includes a read only memory (ROM) 108 or other static storage device coupled to bus 102 for storing static information and instructions for processor 104 and processor 105. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for memory management in a run-time environment. According to one embodiment of the invention, managing memory in a run-time environment is provided by computer system 100 in response to processor 104 and/or processor 105 executing one or more sequences of one or more instructions contained in main memory 106. Such instructions may be read into main memory 106 from another computer-readable medium, such as storage device 110. Execution of the sequences of instructions contained in main memory 106 causes processor 104 and/or processor 105 to perform the process steps described herein. Although FIG. 1 depicts a dual processing arrangement with processors 104 and 105, one or more processors in a uni-processing or multi-processing arrangement, respectively, may also be employed to execute the sequences of instructions contained in main memory 106. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 and/or processor 105 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described infra, or any other medium from which a computer can read.

Various forms of computer readable media may be involved in carrying one or more sequences of one or more instructions to processor 104 and/or processor 105 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 and/or processor 105 retrieves and executes the instructions. The instructions received by main memory 106 may optionally be stored on storage device 110 either before or after execution by processor 104 and/or processor 105.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for memory management in a run-time environment as described herein. The received code may be executed by processor 104 as it is received, and/or stored in storage device 110, or other non-volatile storage for later execution. In this manner, computer system 100 may obtain application code in the form of a carrier wave.

"Virtual memory" refers to memory addressable by a storage allocation technique in which auxiliary storage, such as memory in storage device 110, can be addressed as though it were part of the main memory 106. More specifically, combinations of hardware, firmware, and operating system cooperate to automatically swap portions of the code and data for an executing process on an as-needed basis. Thus, the virtual address space may be regarded as addressable main memory to a process executing on a computer system that maps virtual addresses into real addresses. The size of the virtual address space is usually limited by the size of a native machine pointer, but not by the actual number of storage elements in main memory 110.

On many operating systems, a process will utilize a certain amount of virtual memory that no other user process may access in order to provide data security. "Shared memory" refers to the virtual address space on the computer system 100 that is concurrently accessible to a plurality of executing user processes on a processor 104. In some embodiments, shared memory is also accessible to executing user processes on a plurality of processors, such as processors 104 and 105.

"Secondary storage" as used herein refers to storage elements, other than virtual memory, accessible to a process. Secondary storage may be local or networked. Local secondary storage, furnished by storage device 110 on computer system 100, is preferably a random access storage device such as a magnetic or optical disk. Networked secondary storage is provided by storage devices on other computer systems, for example on host 124, accessible over a local area network 122, or server 130, accessible over a wide area network such as the Internet.

NUMERIC REFERENCES

A numeric reference employs a machine-independent format for encoding references between objects that is suitable for both run-time use in virtual memory and storage use in secondary storage. Unlike symbols and strings employed with pointer swizzling, numeric references are easily stored in a secondary storage, in some cases needing no conversion at all and in other cases requiring only minor arithmetic-logical operations such as bit-twiddling and byte rearrangement. For run-time usage, numeric references can be efficiently "dereferenced," that is, converted into a machine pointer, without requiring many memory accesses into an auxiliary symbol table, hash table, tree, or other complex data structure. Therefore, numeric references need not be converted into machines at load time, reducing the overhead of loading program state.

Preferably, numeric references are implemented in a run-time environment that requires all encoded data (e.g. for objects) to be strongly typed and all primitive types, including references, to have an invariant format. For example, a run-time environment may require floating point numbers to use an IEEE format. In such a run-time environment, references between objects, conventionally implemented by machine pointers, are encoded as integer values indicating offsets from an implicit machine pointer. The numeric reference is defined to be invariant, having a specified number of bytes, a specified byte-ordering, and a specified alignment. The implicit machine pointer is a virtual address that is derivable from the memory environment of one the objects.

For example, numeric references may be encoded as a little endian, two's complement (if signed) four-byte integer referring to objects aligned on an eight-byte boundary, although numeric references in accordance with the present invention, of course, are not limited to these particular specifications. Since almost all machines provide a mapping between a numeric type and a native primitive type, accessing data in this format is at least as efficient as, for example, accessing structures generated by C compilers for that machine.

The use of numbers to encode references stems from the realization that the invariant format for encoding objects and primitive types in a run-time environment ensures that every instance of a type will have the same size between platforms. Since every object has a consistent size between platforms, the relative locations between objects are also consistent. Since objects on any platform will be located at a consistent offset from some point in the virtual address space, this offset can be expressed as a consistent number of bytes from a virtual address. Thus, numeric references include an offset portion that indicates a number of bytes from an implicit address. Consequently, numeric references are machine-independent, and program state with numeric references can be used on incompatible processors, such as processors with differently sized machine pointers.

Since a process may use some of its virtual address space for storing non-invariant data, i.e. for purposes other than storing program state, it is useful to define a physical or logical area of the virtual address space in which the offsets between objects remain consistent and thus can be advantageously expressed as numbers. An "object memory" is a subset of the virtual address space containing either existing objects or available space for allocating new objects. Since an object memory is a subset of the virtual address space, numeric references within the object memory can be smaller than machine pointers. For example, 32-bit (four-byte) numeric references can be profitably used on a computer with a 64-bit virtual address space ($2^{64}$, about 16 billion gigabytes). Since one of the impediments to machine-independence is the differing sizes of machine pointers, the use of fixed-size numeric references, even in very large virtual address spaces, helps in attaining a machine-independent reference format.

In some implementations, a plurality of object memories are provided, for example, to hold objects of different durations, or of other distinct characteristics, to assist in garbage collection. Accordingly, numeric references encode references between objects in the same object memory. References between objects of different object memory, on the other hand, would be encoded in another reference format having the same size as the numeric reference. For example, indexed references, which are described infra, are one type of format that may be used for such inter-object memory references.

In contrast to symbols swizzled from machine pointers, numeric references are easily converted into and from machine pointers. In general, a numeric reference to an object is converted into a machine pointer to the object by adding an offset contained in the numeric reference to an implicit virtual address. Conversely, a machine pointer to the object is converted into a numeric reference by calculating a pointer difference between the machine pointer to the object and the implicit virtual address. The implicit virtual address points to the beginning of a region of the virtual memory space in which the referencing object or the referenced object is located. The precise identity of the implicit virtual address depends more specifically on the species of the numeric reference that is employed.

Three numeric references are disclosed herein: (1) a base-offset numeric reference, which contains an offset relative to a "base address" at the beginning of the object memory, especially if the object memory consists of a contiguous segment of memory, (2) a page-offset numeric reference that is relative to the start of a page also specified in the numeric reference, and (3) a self-relative numeric reference, relative to the beginning of the referencing object.

SELF-RELATIVE NUMERIC REFERENCES

A self-relative numeric reference encodes the location of a referenced object as an offset from the object that references the referenced object. A self-relative numeric reference is illustrated with respect to an exemplary memory configuration of portions of a virtual address space 210 as shown in FIG. 2. Virtual address space 210 includes an object memory comprising page 212*a* and page 212*b*. Object 214 is located at an address within page 212*a* marked by machine pointer S, and object 216 is located at an address within page 212*b* marked by object machine pointer P. In this configuration, object 214 contains a self-relative numeric reference, which encodes the location of object 216 relative to the location of object 214.

More specifically, since referencing object 214 contains a self-relative numeric reference to referenced object 216, the self-relative numeric reference contains an offset to the referenced object 216 that is relative to an address of the referencing object 214, e.g. the starting address of the object 214. Dereferencing a self-relative numeric reference therefore entails adding the offset to the virtual address of the start of the referencing object 214. Since the virtual address to the referencing object 216 is used to fetch the self-relative numeric reference from memory in the first place, a machine pointer with this virtual address is probably sitting in a high-speed register. Even if the machine pointer is not in a register, it is on the stack and probably in the cache or in a loaded page. Therefore, the overhead for generating a machine pointer from a self-relative numeric reference is fast, nearly commensurate with dereferencing a machine pointer and much faster than dereferencing other numeric references.

TAGGED REFERENCES

In some environments, it is desirable for some objects to be allocated on a plurality of non-contiguous pages. For example, objects may be located in a shared memory accessible to other processes but highly fragmented. In such case, it may be difficult for the operating system to allocate more than a moderate number of contiguous bytes, for example, from 256 B ($2^8$ bytes) to 32 kB ($2^{15}$ bytes), such as 4 kB ($2^{12}$ bytes). These moderately sized contiguous memory segments are referred to as "pages."

When storage for an object crosses a page boundary, slot-access operations for the paged object need additional support from the run-time environment. A slot-access operation gets or sets a value of a "slot" in a object (i.e. a field or instance variable) at a known displacement from the virtual address of the beginning of the object. If the object is fully contiguous, then the address of the slot can be determined simply by adding the displacement to the beginning of the object. For paged objects, on the other hand, this addition results in an invalid address, because the page boundary may occur between any of the slots and vary from instance to instance.

Accordingly, a slot-access operation of a machine pointer to a paged object requires checking to see if adding the displacement crosses one or more page boundaries. If a page boundary is crossed, then an ancillary data structure, called a "page map," is consulted for generating the proper virtual address of the slot to perform the slot-access operation.

It is evident that the slot-access operation for a paged object is fairly cumbersome. Therefore, it is desirable, when allocating memory for an object, to find or allocate a new page that can fit the object if possible. Preferably, only those objects that are larger than the effective page size (i.e. the fixed page size minus the page header size) are allocated on a plurality of pages. Since distinguishing between paged objects and contiguous objects is needed for performing a slot-access operation, the contiguity of the referenced object is preferably stored in the machine pointer itself, thereby avoiding a memory fetch of that storage property from the object's header. In one embodiment, this storage property is stored a machine pointer tag.

Furthermore, information about the contiguity of the referenced object is stored in a tag of the numeric reference so that the appropriate tag may be efficiently determined for a machine pointer generated from the numeric reference. Referring to FIG. 3, a layout of an exemplary four-byte (32-bit) tagged self-relative numeric reference 300 is depicted. The self-relative numeric reference 300 includes a small number of bits for a tag 302, that is used to cache the storage properties of the referenced object, and in other embodiments for discriminating among various types of numeric references.

The self-relative numeric reference 300 also includes an offset 304, which indicates the displacement from the referencing object taking into account the tag portion 302. For example, a self-relative numeric reference having a hexadecimal value of 0x0423CBD0 specifies a displacement of 69,454,800 bytes from the referencing object. As another example, a three-bit tagged numeric reference of 0x00004321 specifies a displacement of 0x00004320 or 17,184 bytes from the referencing object.

A preferred implementation of tagging introduces an alignment invariant and then exploits the alignment invariant in a run-time environment to encode the storage property in the lower-order bits. Specifically, objects managed by the run-time environment are stored at an N-bit aligned address, or, in other words, the storage for these objects begins at virtual addresses at $2^N$-byte boundaries. For example, if the objects can be stored at three-bit aligned addresses, that is, on $2^3=8$ byte boundaries, a legal start address for such an object might be 0x20446740, but an address such as 0x20446743 is not a valid start address for the storage of an object. Consequently, the three least significant bits of the reference do not serve to differentiate different objects, since only one of the eight values for the three least significant bits is a legal address and the remaining seven values do not point to any other object. Given this alignment restriction, references that resolve to addresses 0x20446740 through 0x20446747 effectively refer to the same object.

Therefore, any of the N least significant bits of a reference to an N-bit aligned object can be used as a tag to encode other information, namely the storage properties of the referenced object. The remaining portion of the reference contains the address for a machine pointer or an offset for a numeric reference with possibly other information important for the particular format of the numeric reference, such as the page number.

Reference tagging also allows self-relative numeric references to be used in conjunction with other numeric reference formats and even other reference formats. For example, an indexed reference is a kind of reference that evaluates to an array entry of one sort or another. Some of the non-tag bits of the indexed reference specify the array and others specify an index into the array. A page-offset numeric reference may be thought of a hybrid numeric reference and indexed reference, wherein the page number specifies an index into the page map and the offset portion specifies a relative location of the object within the page. As mentioned earlier, some embodiments restrict the use of numeric references for encoding references between objects in the same object memory; accordingly, indexed references provide a mechanism for supporting references between objects of different object memories.

TAG ASSIGNMENT FOR SELF-RELATIVE NUMERIC REFERENCES

Dereferencing a tagged self-relative numeric references is a performance critical operation. Producing a properly tagged machine pointer from a tagged self-relative numeric reference requires performing the correct address calculation and the correct tag calculation. Since address calculation by adding the offset to the address of the referencing object is already efficient, it is desirable to make the tag calculation as fast as possible. An elementary approach for tag calculation is to remove the tag from the referencing machine pointer, for example, by masking, and then add the self-relative numeric reference, tag and all, to produce the appropriately tagged machine pointer to the referenced object.

For example, referencing contiguous object 414 at location 0x1C209B70 contains a self-relative numeric reference to referenced paged object 416 at location 0x20446740. Without pointer tagging, the offset of the self-relative numeric reference is 0x20446740−0x1C209B70= 0x0423CBD0, and dereferencing the self-relative numeric reference involves adding the referencing pointer 0x1C209B70 to the offset 0x0423CBD0 to produce the referenced pointer 0x20446740. With a tag assignment of 2 for a contiguous object and 6 for a paged object, on the other hand, the elementary approach involves masking the tagged referencing pointer 0x1C209B72 to produce 0x1C209B70 and adding it to the self-relative numeric reference 0x0423CBD6 to produce the appropriately tagged reference pointer 0x20446746. It would be desirable to avoid this masking step.

One aspect of the present invention stems from the realization that the tag calculation can be integrated with the address calculation by an appropriate assignment scheme for tag values of machine pointers and self-relative numeric references. More specifically, the tagged referencing machine pointer can be added to the tagged self-relative numeric reference to generate an appropriately tagged machine pointer to the referenced object. In a preferred embodiment, this address calculation also includes the addition of a small constant as described infra.

The tag calculation is aided by assigning tags to the self-relative numeric reference to indicate the relative contiguities of the referenced object to the referencing object, rather than the absolute contiguity of the referenced object. Specifically, the self-relative numeric reference includes one tag value to indicate that the referenced object has the same contiguity as the referencing object or another tag value to indicate that the referenced object has a different contiguity than the referencing object.

For example, if the referencing object is contiguous and the referenced object is contiguous, then the tag of the self-relative numeric reference indicates that the referenced object has the same contiguity as the referencing object. Similarly, if the referencing object is paged and the referenced object is paged, then the tag of the self-relative numeric reference would also indicate that the referenced object has the same contiguity as the referencing object. On the other hand, if the referencing object is contiguous and the referenced object is paged, then the tag of the self-relative numeric reference indicates that the referenced object has a different contiguity than the referencing object. Similarly, if the referencing object is paged and the referenced object is contiguous, then the tag of the self-relative numeric reference would also indicate that the referenced object has a different contiguity as the referencing object.

Appropriate pointer tag values and self-relative numeric reference tag values are chosen based on the following simultaneous equations, wherein PP denotes a pointer tag value for a pointer to a paged object, PC denotes a pointer tag value for a pointer to a contiguous object, NS denotes a numeric reference tag value for a self-relative numeric reference to an object with the same contiguity, ND denotes a numeric reference tag value for a self-relative numeric reference to an object with a different contiguity, and K denotes a constant:

$$PP+NS+K=PP \quad (1)$$

$$PC+NS+K=PC \quad (2)$$

$$PP+ND+K=PC \quad (3)$$

$$PC+ND+K=PP \quad (4)$$

Subtracting equation (4) from equation (3) leads to the conclusion that (PP−PC)=(PC−PP), which means that PP and PC must differ by $2^{N-1}$ congruent to $2^N$ for an N-bit tag, since PP and PC cannot be equal. Subtracting equation (3) from equation (1) leads to the conclusion that (NS−ND)=(PP−PC), also means that NS and ND must differ by a remainder congruent to $2^{N-1}$ modulo $2^N$. Finally, from either equation (1) or equation (2), K=−NS.

The purpose of the constant K in the address calculation is to allow the self-relative numeric reference NS tag to have some value other than zero, for example, to allow a page-offset numeric reference to use a tag of zero. Generally, it is desirable to initialize, where possible, NULL references with all zero bits. Since a self-relative numeric reference with an offset of zero points to the referencing object and is not NULL, the zero numeric reference tag value is preferably reserved for a numeric reference or indexed reference type that can encode NULL with all zero bits, such as a page-offset numeric reference.

TAGGED SELF-RELATIVE NUMERIC REFERENCE ADDRESS CALCULATION

FIG. 4 illustrates steps taken to produce a tagged self-relative numeric reference based on a machine pointer P to object 216 for storage in object 214. At step 400, the tagged machine pointer P to object 216 is obtained, typically from a variable passed into a function, returned from a function or memory allocation operator, loaded from a memory address not part of the program state, or produced by dereferencing a numeric reference. At step 402, a tagged source machine pointer S containing the virtual address of the referencing object is determined. Since a tagged self-relative numeric reference 300 is to be stored in the referencing object, this tagged source machine pointer S is already available, typically in a high-speed memory such as a register or cache. At step 404, both the offset 304 and the tag 302 of the self-relative numeric reference 300 are calculated together as a difference of the tagged virtual address of the referenced object 216 and the tagged virtual address of the referencing object 214. This calculation can be performed by subtracting the tagged source pointer S from the tagged object pointer P. In one embodiment, the subtraction also includes subtracting a constant from the result in order to impart some flexibility in the choice of self-relative numeric reference tags.

FIG. 5 illustrates steps taken to produce a tagged machine pointer P based on a tagged self-relative numeric reference 300 to object 216, wherein the tagged self-relative numeric reference 300 is contained in object 214. At step 500, the tagged self-relative numeric reference 300 to object 216 is obtained, by reading from a memory address within the program state, specifically from within referencing object 214. At step 502, a tagged source pointer S containing the virtual address of the referencing object is determined. Since the tagged self-relative numeric reference is fetched from the referencing object, the tagged machine pointer for the referencing object 214 is already available, typically in a high-speed memory such as a register or cache. At step 504, the tagged machine pointer the object 216 is obtained by adding the tagged self-relative numeric reference 300 to the tagged source machine S of the referencing object 414. In one embodiment, this calculation also includes adding a constant in order to impart some flexibility in the choice of self-relative numeric reference tags.

Address calculation of tagged self-relative numeric references for (A) a contiguous object referencing a contiguous object, (B) a contiguous object referencing a paged object, (C) a paged object referencing a contiguous, and (D) a paged object referencing a paged object is described according to an exemplary pointer tag assignment given in TABLE 1 and according to an exemplary numeric reference tag assignment given in TABLE 2.

TABLE 1

POINTER TAG ASSIGNMENT

| TAG | PROPERTY |
|---|---|
| 0 | Object is in Pointer format. |
| 1 | Object is in Pointer format. |
| 2 | Object is Contiguous and in Numeric Reference format. |
| 3 | N/A |
| 4 | N/A |
| 5 | N/A |
| 6 | Object is Paged and in Numeric Reference format. |
| 7 | N/A |

The tag assignments listed in TABLE 1 are appropriate for a memory management system in which objects in numeric reference format are subject to the paged memory management. An object in numeric reference format refers to an object in which all references contained therein are formatted as numeric references or indexed references, but not as machine pointers. The choice of 2 and of 6 for 3-bit machine pointer tag values are appropriate in this example, because the difference between tag values 2 and 6 is congruent to 4 modulo 8, which is $2^3$. In this case, tag value of 2 is selected for contiguous objects, which are stored in a single segment of contiguous memory, for example on a single page, and a tag value of 4 is selected for paged objects, which are stored in a plurality of memory segments. However, the present invention is not limited to this particular machine pointer tag assignment. Other tag assignments may be adopted as long as the difference between the contiguous object tag and the paged object tag is congruent to $2^{N-1}$ modulo $2^N$, where N is the number of least significant bits allocated for the tag value.

TABLE 2

NUMERIC REFERENCE TAG ASSIGNMENT

| TAG | PROPERTY |
|---|---|
| 0 | Page-Offset Numeric Reference to a Contiguous Object |
| 1 | Indexed Reference |
| 2 | N/A |
| 3 | Self-Relative Numeric Reference with Different Contiguity |
| 4 | Page-Offset Numeric Reference to a Paged Object |
| 5 | Indexed Reference |
| 6 | N/A |
| 7 | Self-Relative Numeric Reference with Same Contiguity |

The tag assignments listed in TABLE 2 are appropriate for a memory management system in which objects in numeric reference format may contain page-offset numeric references, self-relative numeric references, and indexed references. Accordingly, the choice of 7 and 3 for the 3-bit numeric reference tag values are appropriate, because the difference between tag values 7 and 3 is congruent to 4 modulo 8, which is $2^3$. In this case, tag value of 7 is selected for a referenced object with the same contiguity as the referencing object, and a tag value of 3 is selected for a referenced object with a different contiguity as the referencing object. Since the same contiguity tag value of 7 (congruent to −1 modulo 8), the constant K, according to this exemplary numeric reference tag assignment, is 1. However, the present invention is not limited to this particular numeric reference tag assignment. Other tag assignments may be adopted as long as the difference between the same contiguity tag and the different contiguity tag is congruent to $2^{N-1}$ modulo $2^N$, where N is the number of least significant bits allocated for the tag value, and the constant K is congruent to the additive inverse of the tag value for the same contiguity.

A. CONTIGUOUS REFERENCING OBJECT AND CONTIGUOUS REFERENCED OBJECT

If referencing object 414 at location 0x1C209B70 is contiguous, then a tagged referencing machine pointer S to referencing object 414 would be 0x1C209B72. If referenced object 416 at location 0x20446740 is contiguous, then a tagged referenced machine pointer P to the referenced object 416 would be 0x20446742. Using K=1 as the constant, a self-relative numeric reference 300 is calculated to be 0x20446742−0x1C209B72−1=0x0423CBC7, which has the numeric reference correct tag value of 7 for objects with the same contiguity. Dereferencing the tagged self-relative numeric reference 300 involves the calculation: 0x1C209B72+0x0423CBC7+1=0x20446742, whose machine pointer tag value of 2 correctly indicates that the referenced object 416 is contiguous.

B. CONTIGUOUS REFERENCING OBJECT AND PAGED REFERENCED OBJECT

If referencing object 414 at location 0x1C209B70 is contiguous, then a tagged referencing machine pointer S to referencing object 414 would be 0x1C209B72. If referenced object 416 at location 0x20446740 is paged, then a tagged referenced machine pointer P to the referenced object 416 would be 0x20446746. Using K=1 as the constant, a self-relative numeric reference 300 is calculated to be 0x20446746−0x1C209B72−1=0x0423CBD3, which has the numeric reference correct tag value of 3 for objects with different contiguities. Dereferencing the tagged self-relative numeric reference 300 involves the calculation: 0x1C209B72+0x0423CBD3+1=0x20446746, whose machine pointer tag value of 6 correctly indicates that the referenced object 416 is paged.

C. PAGED REFERENCING OBJECT AND CONTIGUOUS REFERENCED OBJECT

If referencing object 414 at location 0x1C209B70 is paged, then a tagged referencing machine pointer S to referencing object 414 would be 0x1C209B76. If referenced object 416 at location 0x20446740 is contiguous, then a tagged referenced machine pointer P to the referenced object 416 would be 0x20446742. Using K=1 as the constant, a self-relative numeric reference 300 is calculated to be 0x20446742−0x1C209B76−1=0x0423CBCB, which has the correct numeric reference tag value of 3 for objects with different contiguities. Dereferencing the tagged self-relative numeric reference 300 involves the calculation: 0x1C209B76+0x0423CBCB+1=0x20446742, whose machine pointer tag value of 2 correctly indicates that the referenced object 416 is contiguous.

D. PAGED REFERENCING OBJECT AND PAGED REFERENCED OBJECT

If referencing object 414 at location 0x1C209B70 is paged, then a tagged referencing machine pointer S to referencing object 414 would be 0x1C209B76 If referenced object 416 at location 0x20446740 is paged, then a tagged referenced machine pointer P to the referenced object 416 would be 0x20446746. Using K=1 as the constant, a self-relative numeric reference 300 is calculated to be 0x20446746−0x1C209B76−1=0x0423CBC7, which has the numeric reference correct tag value of 7 for objects with the same contiguity. Dereferencing the tagged self-relative numeric reference 300 involves the calculation: 0x1C209B76+0x0423CBC7+1=0x20446746, whose machine pointer tag value of 6 correctly indicates that the referenced object 416 is contiguous.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method of generating a first tagged machine pointer to a first object referenced by a second object, said method comprising the computer-implemented steps of:

fetching a tagged numeric reference stored within the second object based on a second tagged machine pointer that points to the second object; and generating the first tagged machine pointer as a sum including the tagged numeric reference and the second tagged machine pointer.

2. The method of claim 1, wherein the sum further includes a predetermined constant.

3. The method of claim 1, wherein the tagged numeric reference includes a tag portion that indicates whether the first object has a same or a different contiguity as a contiguity of the second object.

4. The method of claim 3, wherein:

the tag portion includes N bits of the first tagged numeric reference that are less significant than bits used for an offset portion; and the tag portion contains one of at least a first tag value indicating that the first object is contiguous and a second tag value indicating that the second object is non-contiguous, wherein a difference of the first tag value and the second tag value is congruent to $2^{N-1}$ modulo $2^N$.

5. The method of claim 1, wherein:

tag potions of the tagged numeric reference comprise N bits and store at least a first tag value and a second value indicating complementary properties; and a difference of the first tag value and the second tag value is congruent to $2^{N-1}$ modulo $2^N$.

6. The method of claim 1, wherein the sum consists of the tagged numeric reference and the second tagged machine pointer.

7. A method of managing memory, comprising the computer-implemented steps of:

storing a first object and a second object in a memory, wherein the first object and the second object do not overlap each other; and storing a reference within a first object to a second object in the memory as a numeric reference that encodes a location of the second object as an offset from an address of the first object in the memory.

8. The method of claim 7, further comprising the step of calculating a pointer difference between a first machine pointer to the first object and a second machine pointer to the second object to produce the numeric reference.

9. The method of claim 8, wherein the first machine pointer is a first tagged machine pointer, the second machine pointer is a second tagged machine pointer, and the numeric reference is a tagged numeric reference.

10. The method of claim 9, wherein the pointer difference further includes a predetermined constant.

11. The method of claim 9, wherein a tag portion of the tagged numeric reference indicates whether the first object has a same or a different contiguity as a contiguity of the second object.

12. The method of claim 11, wherein:
the tag portion includes N bits of the tagged numeric reference that are less significant than bits used for an offset portion of the tagged numeric reference; and
the tag portion contains one of at least a first tag value indicating that the first object is contiguous and a second tag value indicating that the second object is non-contiguous, wherein a difference of the first tag value and the second tag value is congruent to $2^{N-1}$ modulo $2^N$.

13. The method of claim 7, wherein:
the memory is subdivided into a plurality of pages;
the first object is stored on a first page; and
the second object is stored on a second page, other than the first page.

14. A computer-readable medium bearing instructions for generating a first tagged machine pointer to a first object referenced by a second object, said instructions arranged, when executed, to cause one or more processors to perform the steps of:
fetching a tagged numeric reference stored within the second object based on a second tagged machine pointer that points to the second object; and
generating the first tagged machine pointer as a sum including the tagged numeric reference and the second tagged machine pointer.

15. The computer-readable medium of claim 14, wherein the sum further includes a predetermined constant.

16. The computer-readable medium of claim 14, wherein the tagged numeric reference includes a tag portion that indicates whether the first object has a same or a different contiguity as a contiguity of the second object.

17. The computer-readable medium of claim 16, wherein:
the tag portion includes N bits of the first tagged numeric reference that are less significant than bits used for an offset portion; and
the tag portion contains one of at least a first tag value indicating that the first object is contiguous and a second tag value indicating that the second object is non-contiguous, wherein a difference of the first tag value and the second tag value is congruent to $2^{N-1}$ modulo $2^N$.

18. The computer-readable medium of claim 14, wherein:
tag potions of the tagged numeric reference comprise N bits and store at least a first tag value and a second value indicating complementary properties; and
a difference of the first tag value and the second tag value is congruent to $2^{N-1}$ modulo $2^N$.

19. The computer-readable medium of claim 14, wherein the sum consists of the tagged numeric reference and the second tagged machine pointer.

20. A computer-readable medium bearing instructions for managing memory, said instructions arranged, when executed, to cause one or more processors to perform the steps of:
storing a first object and a second object in a memory, wherein the first object and the second object do not overlap each other; and
storing a reference within a first object to a second object in the memory as a numeric reference that encodes a location of the second object as an offset from an address of the first object in the memory.

21. The computer-readable medium of claim 20, said instructions further arranged to cause said one or more processors to perform the step of calculating a pointer difference between a first machine pointer to the first object and a second machine pointer to the second object to produce the numeric reference.

22. The computer-readable medium of claim 21, the first machine pointer is a first tagged machine pointer, the second machine pointer is a second tagged machine pointer, and the numeric reference is a tagged numeric reference.

23. The computer-readable medium of claim 22, wherein the pointer difference further includes a predetermined constant.

24. The computer-readable medium of claim 22, wherein a tag portion of the tagged numeric reference indicates whether the first object has a same or a different contiguity as a contiguity of the second object.

25. The computer-readable medium of claim 24, wherein:
the tag portion includes N bits of the tagged self-relative numeric reference that are less significant than bits used for an offset portion; and
the tag portion contains one of at least a first tag value indicating that the first object is contiguous and a second tag value indicating that the second object is non-contiguous, wherein a difference of the first tag value and the second tag value is congruent to $2^{N-1}$ modulo $2^N$.

26. The computer-readable medium of claim 20, wherein:
the memory is subdivided into a plurality of pages;
the first object is stored on a first page; and
the second object is stored on a second page, other than the first page.

* * * * *